(12) United States Patent
Kobayashi

(10) Patent No.: US 7,271,846 B2
(45) Date of Patent: Sep. 18, 2007

(54) RECEIVING APPARATUS

(75) Inventor: Takashi Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 518 days.

(21) Appl. No.: 10/391,566

(22) Filed: Mar. 20, 2003

(65) Prior Publication Data

US 2003/0184682 A1 Oct. 2, 2003

(30) Foreign Application Priority Data

Mar. 26, 2002 (JP) .............................. 2002-085883

(51) Int. Cl.
*H04N 5/445* (2006.01)

(52) U.S. Cl. .................. 348/564; 348/569; 348/589; 348/563; 348/465; 725/40

(58) Field of Classification Search ................ 348/564, 348/565, 563, 569, 567, 465, 473, 461, 589, 348/598, 600, 570; 725/38, 40, 57, 59
See application file for complete search history.

(56) References Cited

U.S. PATENT DOCUMENTS

| | | | | |
|---|---|---|---|---|
| 5,528,304 A | * | 6/1996 | Cherrick et al. ............... | 725/41 |
| 5,715,020 A | * | 2/1998 | Kuroiwa et al. ............. | 348/734 |
| 5,734,437 A | * | 3/1998 | Back .......................... | 348/563 |
| 5,818,935 A | * | 10/1998 | Maa ............................ | 380/200 |
| 6,415,438 B1 | * | 7/2002 | Blackketter et al. ........ | 725/136 |
| 6,462,746 B1 | * | 10/2002 | Min et al. .................... | 345/545 |
| 6,480,238 B1 | * | 11/2002 | Knox et al. .................. | 348/569 |
| 6,486,921 B1 | * | 11/2002 | Vos ............................ | 348/569 |
| 6,753,928 B1 | * | 6/2004 | Gospel et al. .............. | 348/569 |
| 6,766,524 B1 | * | 7/2004 | Matheny et al. .............. | 725/23 |
| 6,766,528 B1 | * | 7/2004 | Kim et al. ................... | 725/113 |
| 6,772,438 B1 | * | 8/2004 | Blackketter et al. ........ | 725/136 |
| 6,867,815 B2 | * | 3/2005 | Kim et al. ................... | 348/465 |
| 6,876,396 B2 | * | 4/2005 | Mizobuchi et al. ......... | 348/564 |
| 6,930,730 B2 | * | 8/2005 | Maxon et al. .............. | 348/734 |
| 6,943,845 B2 | * | 9/2005 | Mizutome et al. .......... | 348/555 |
| 6,980,972 B1 | * | 12/2005 | Allibhoy et al. .............. | 705/51 |
| 2001/0050679 A1 | * | 12/2001 | Shigeta ....................... | 345/204 |
| 2005/0179822 A1 | * | 8/2005 | Takano et al. .............. | 348/705 |

* cited by examiner

*Primary Examiner*—David Ometz
*Assistant Examiner*—Jean W. Désir
(74) *Attorney, Agent, or Firm*—Fitzpatrick, Cella, Harper & Scinto

(57) ABSTRACT

A receiving apparatus includes a reception unit which receives moving image data transmitted from a source node, an acquisition unit which requests the source node to send information including a vendor name of the source node so as to acquire the vendor name of the source node from the source node, and a character generation unit which generates vendor name character data indicating the vendor name of the source node acquired by the acquisition unit. A synthesis unit superimposes the vendor name character data on the moving image data if the vendor name of the source node is acquired by the acquisition unit, and superimposes predetermined character data on the moving image data if the vendor name of the source node cannot be acquired by the acquisition unit.

12 Claims, 4 Drawing Sheets

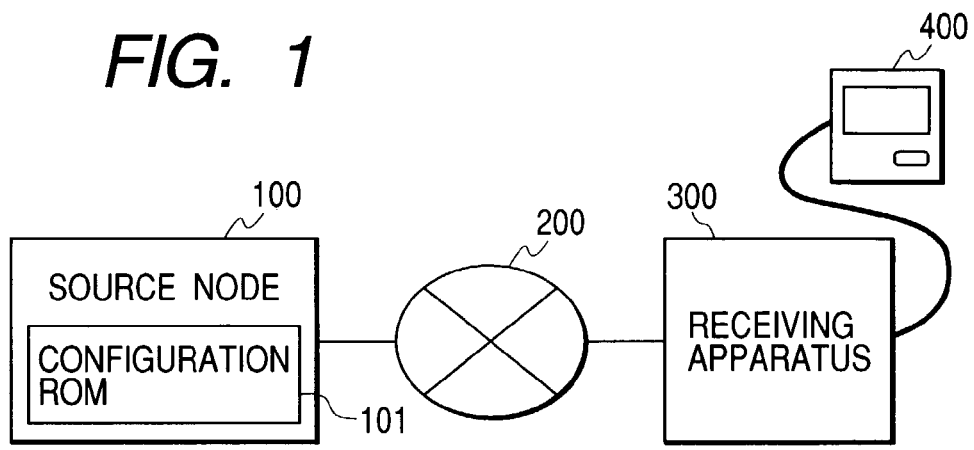
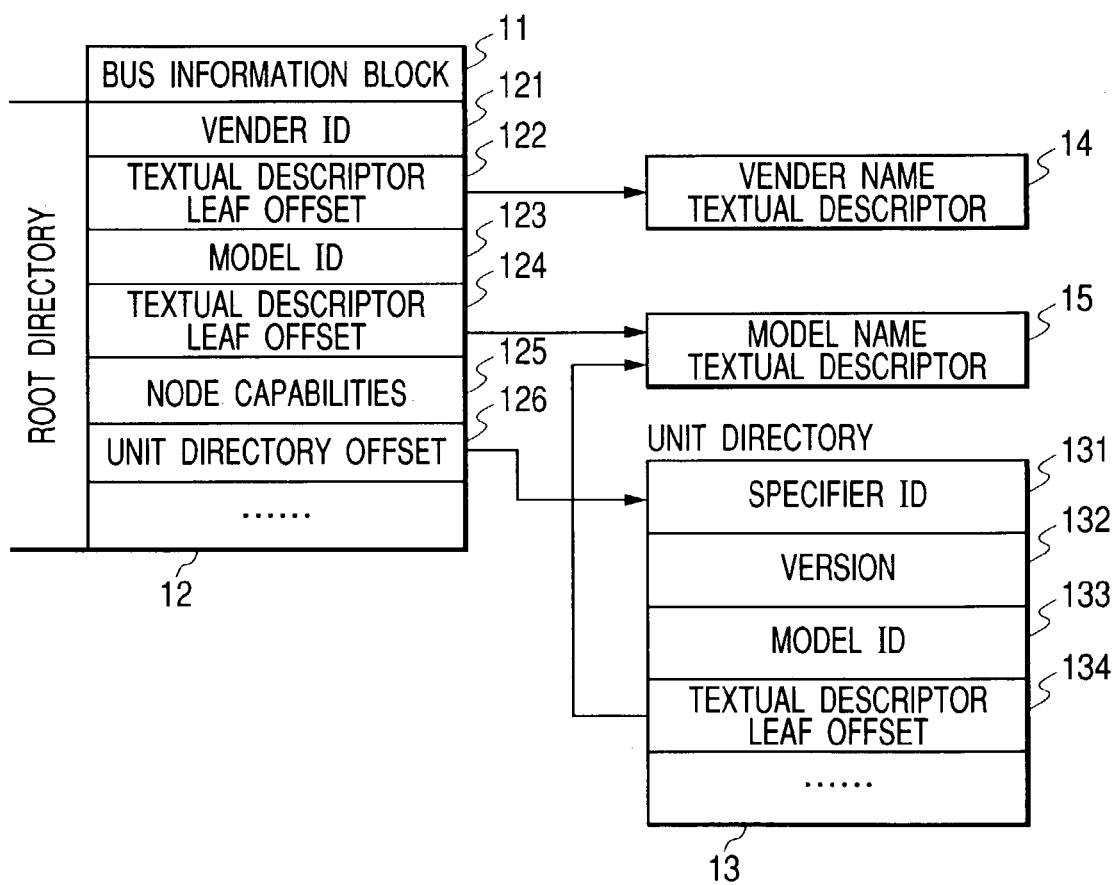

RECEIVING APPARATUS

BACKGROUND OF THE INVENTION

1. Field of the Invention

The present invention relates to a receiving apparatus for receiving moving image data from a network.

2. Related Background Art

A current digital video camera is capable of receiving, through a digital interface based on IEEE Std 1394-1995, moving image data transmitted from a node on a network according to a communication protocol based on IEC61883. The moving image data received by the digital video camera are displayed on a monitor of the digital video camera and/or a display apparatus externally connected to the digital video camera, so that the user can confirm the content of such data.

However, the current digital video camera, in displaying the moving image data transmitted from a node on a network according to the communication protocol based on the IEC61883, is incapable of displaying a vendor name of a source node (also called transmitting apparatus) of the moving image data or a model name of such source node. Therefore, in case plural nodes are present on the network, it is not easy to specify the source node of the moving image data, displayed on the monitor of the digital video camera and/or the display apparatus externally connected to the digital video camera. Such drawback arises not only in a digital video camera but also in other apparatuses (personal computer, digital video recording, digital television receiver etc.).

SUMMARY OF THE INVENTION

An object of the present invention is to overcome the above-described drawbacks.

Another object of the present invention is to facilitate specifying of the source node of moving image data received from a network.

A receiving apparatus includes a reception unit which receives moving image data transmitted from a source node, an acquisition unit which requests the source node to send information including a vendor name of the source node so as to acquire the vendor name of the source node from the source node, and a character generation unit which generates vendor name character data indicating the vendor name of the source node acquired by the acquisition unit. A synthesis unit superimposes the vendor name character data on the moving image data if the vendor name of the source node is acquired by the acquisition unit, and superimposes predetermined character data on the moving image data if the vendor name of the source node cannot be acquired by the acquisition unit.

A receiving apparatus includes a reception unit which receives moving image data transmitted from a source node, an acquisition unit which requests the source node to send information including a model name of the source node so as to acquire the model name of the source node from the source node, and a character generation unit which generates model name character data indicating the model name of the source node acquired by the acquisition unit. In addition, a synthesis unit superimposes the model name character data on the moving image data if the model name of the source node is acquired by the acquisition unit, and superimposes predetermined character data on the moving image data if the model name of the source node cannot be acquired by the acquisition unit.

Still other objects, features and advantages of the present invention will become fully apparent from the following detailed description of the preferred embodiments.

BRIEF DESCRIPTION OF THE DRAWINGS

FIG. 1 is a view showing a network system in an embodiment;

FIG. 2 is a view showing a configuration of a configuration ROM provided in a source node 100 shown in FIG. 1;

DETAILED DESCRIPTION OF THE PREFERRED EMBODIMENTS

Figure 3:
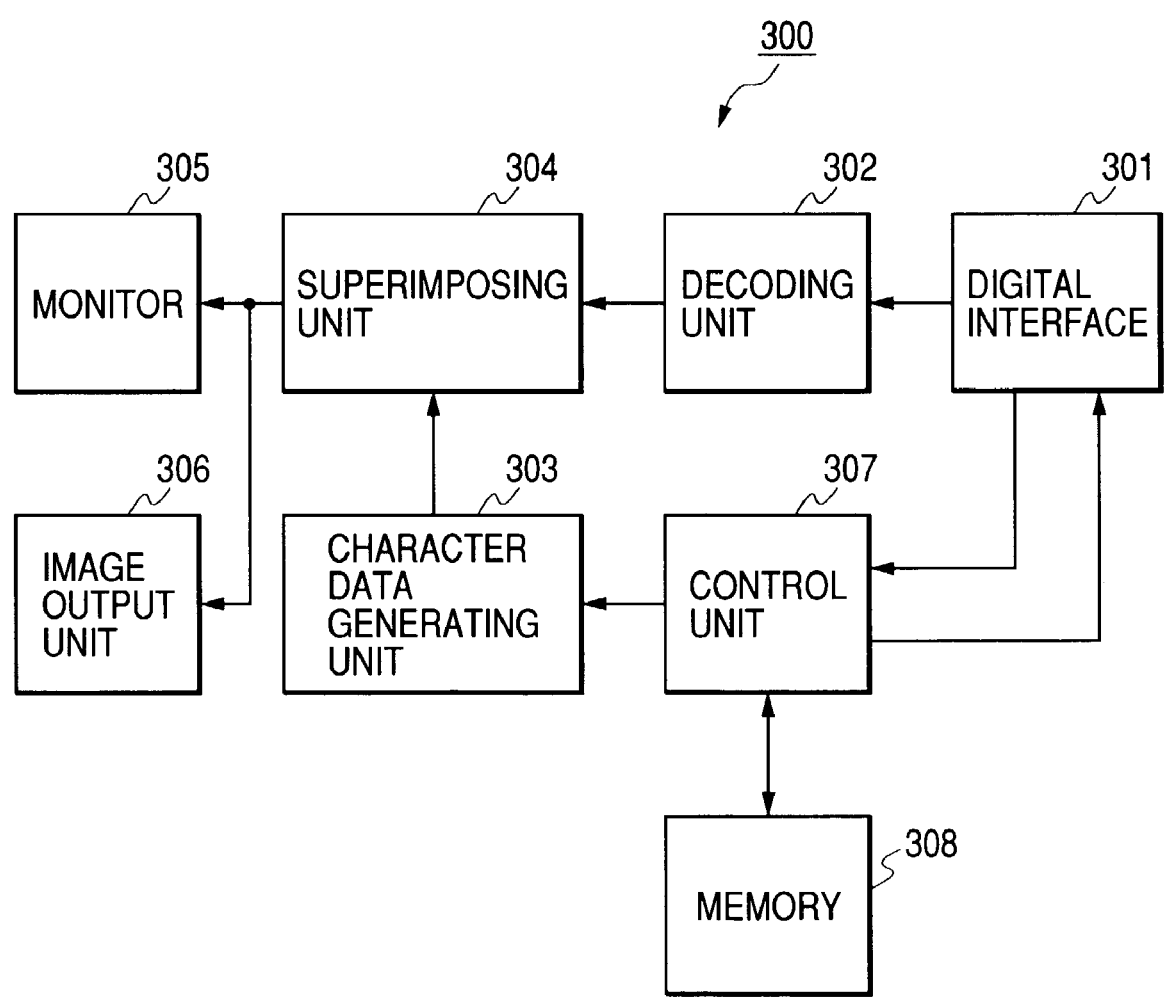
FIG. 3 is a view showing a principal configuration of a receiving apparatus 300 shown in FIG. 1.

In the following there will be explained a preferred embodiment of the present invention, with reference to FIGS. 1 to 5A through 5D.

At first an example of a network in the present embodiment will be explained with reference to FIG. 1.

A source node 100 is one of nodes present on a network 200, and is formed by an apparatus capable of transmitting moving image data (video data) according to a communication protocol based on IEC61883, to a specified node or unspecified plural nodes on the network 200. The source node 100 may be realized by a digital video camera, or another apparatus (personal computer, digital video recorder, digital television receiver etc.).

A receiving apparatus 300 is one of nodes present on the network 200, and is capable of selectively receiving moving image data from the network 200. The received moving image data are displayed on a monitor of the receiving apparatus 300 or a display apparatus 400 externally connected to the receiving apparatus 300. The receiving apparatus 300 may be realized by a digital video camera, or another apparatus (personal computer, digital video recorder, digital television receiver etc.).

The source node 100 and the receiving apparatus 300 are connected to the network 200 through digital interfaces based on IEEE Std 1394-1995 and IEEE Std 1394a-2000. The IEEE Std 1394-1995 is one of standards relating to a serial bus, and the IEEE Std 1394a-2000 is one of extensions of the IEEE Std 1394-1995.

Now, reference is made to FIG. 2 for explaining a configuration ROM provided in the source node 100.

The configuration ROM in the present embodiment is based on ISO/IEC13213, IEEE Std 1394-1995, IEEE Std 1394a-2000 and Configuration ROM for AV/C Devices 1.0 (TA Document 1999027).

The configuration ROM 101 is provided, as shown in FIG. 2, with a bus information block 11, a root directory 12, a unit directory 13, a vendor name textual descriptor 14, and a model name textural descriptor 15.

The bus information block 11 describes basic information defined by IEEE Std 1394-1995 and IEEE Std 1394a-2000. An EUI-64 (extended unique identifier, 64-bits), which is an ID information specific to the source node 100, is also described in the bus information block 11.

The root directory 12 includes, as shown in FIG. 2, entries such as a vendor ID 121, a textual descriptor leaf offset 122, a model ID 123, a textual descriptor leaf offset 124, node capabilities 125, and a unit directory offset 126. The vendor ID 121 describes a vendor ID for identifying the vendor of the source node 100. The textual descriptor leaf offset 122 describes an offset value for obtaining an address of the vendor name textual descriptor 14. The model ID 123 describes a model ID for identifying the type of the source node 100. The textual descriptor leaf offset 124 describes an offset value for obtaining an address of the model name textural descriptor 15. The unit directory offset 126 describes an offset value for obtaining an address of the unit directory 13.

The unit directory 13 includes, as shown in FIG. 2, entries such as a specifier ID 131, a version 132, a model ID 133, and a textual descriptor leaf offset 134. The specifier ID 131 describes ID information (usually same as the vendor ID) specific to a unit provided in the source node 100. The version 132 describes version information indicating a version of the unit provided in the source node 100. The model ID 133 describes data same as those of the model ID 123. The textual descriptor leaf offset 134 describes data same as those in the textual descriptor leaf offset 124.

The vendor name textual descriptor 14 describes an ASCII code indicating the vendor name of the source node 100. In the present embodiment, the vendor name of the source node 100 is assumed as "XXXXX".

The model name textual descriptor 15 describes an ASCII code indicating the model name of the source node 100. In the present embodiment, the model name of the source node 100 is assumed as "YYY DV20".

In the following there will be explained a principal configuration of the receiving apparatus 300, with reference to FIG. 3.

As shown in FIG. 3, the receiving apparatus 300 is provided with a digital interface 301, a decoder unit 302, a character data generation unit 303, a superimpose unit 304, a monitor 305, an image output unit 306, a control unit 307 and a memory 308.

The digital interface 301 is based on IEEE Std 1394-1995 and IEEE Std 1394a-2000. The digital interface 301 has a function of selectively receiving an isochronous packet transmitted by the source node 100, and a function of transmitting a read request packet for reading data in the configuration ROM 101 of the source node 100. The decoder unit 302 has a function of decoding moving image data supplied from the digital interface 301.

The character data generation unit 303 has a function of generating at least one of character data indicating the vendor name of the source node 100, character data indicating the model name of the source node 100 and default character data. The superimpose unit 304 has a function of superimposing (superposing) the character data outputted from the character data generation unit 303, on a predetermined position of the moving image data decoded by the decoder unit 302.

The monitor 305 displays the moving image data supplied from the superimpose unit 304. The image output unit 306 converts the moving image data, supplied from the superimpose unit 304, into an image signal of a predetermined format and supplies such image signal to the display apparatus 400.

Figure 4:
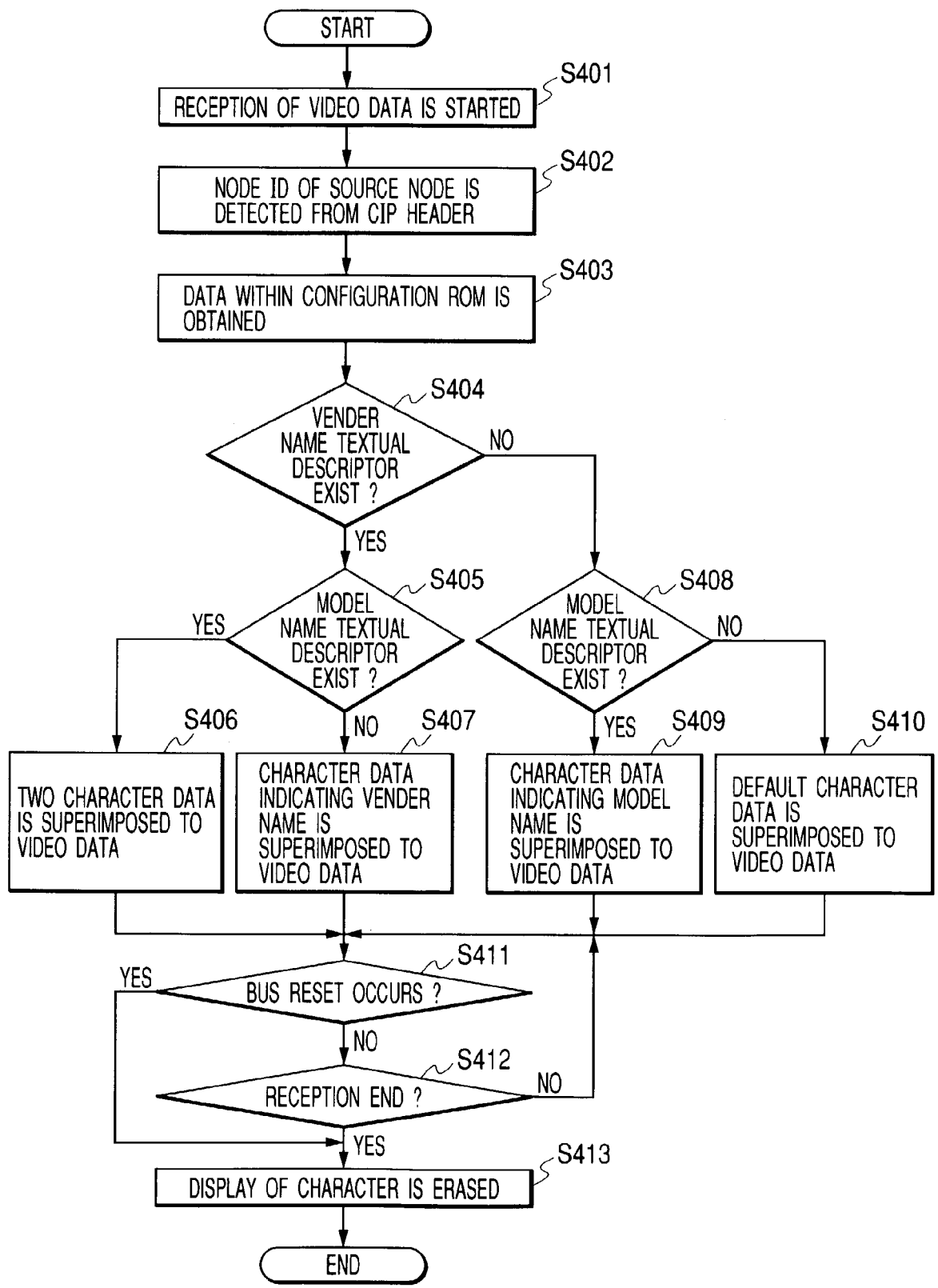
FIG. 4 is a flow chart showing a process sequence of the receiving apparatus 300 shown in FIG. 1.

The control unit 307 has a microcomputer and a memory. The memory in the control unit 307 stores a control program for controlling various functions of the DVC 100. Also a control program for realizing a process sequence shown in FIG. 4 is stored in the memory of the control unit 307. The memory 308 stores data read from the configuration ROM 101 of the source node 100.

Now reference is made to FIG. 4 for explaining the process sequence of the receiving apparatus 300. In the present embodiment, there will be explained a process sequence for receiving an isochronous packet (including moving image data) transmitted by the source node 100.

Step S401: The digital interface 301 initiates a reception of an isochronous packet transmitted from the source node 100. The digital interface 301 extracts moving image data from a data area of the received isochronous packet, and supplies the decoder 302 with the extracted moving image data. Receiving the moving image data, the decoder 302 decodes such moving image data.

Step S402: The digital interface 301 also extracts a CIP (common isochronous packet) header from a data area of the isochronous packet received from the network 200, and supplies the control unit 307 with the extracted CIP header. Receiving the CIP header, the control unit 307 extracts a node ID of the source node 100 from a source ID field in the CIP header. By obtaining the node ID of the source node 100, the receiving apparatus 300 is rendered capable of transmitting a read request packet to the source node 100.

Step S403: The digital interface 301 generates a read request packet for reading the data in the configuration ROM 101 and transmits the generated read request packet to the source node 100. Receiving the read request packet, the source node 100 transmits the data in the configuration ROM 101 to the receiving apparatus 300. The data in the configuration ROM 101 are received by the digital interface 301 and are stored in the memory 308.

Step S404: The control unit 307 refers to the memory 308 and discriminates whether the vendor name textual descriptor 14 is present in the configuration ROM 101. If the vendor name textual descriptor 14 is present in the configuration ROM 101, the control unit 307 executes a process of a step S405. On the other hand, if the vendor name textual descriptor 14 is not present in the configuration ROM 101, the control unit 307 executes a process of a step S408.

Step S405: The control unit 307 refers to the memory 308 and discriminates whether the model name textual descriptor 15 is present in the configuration ROM 101. If the model name textual descriptor 15 is present in the configuration ROM 101, the control unit 307 executes a process of a step S406. On the other hand, if the model name textual descriptor 15 is not present in the configuration ROM 101, the control unit 307 executes a process of a step S407.

Figure 5A:
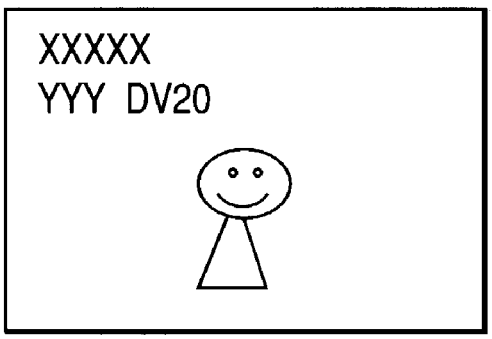
FIGS. 5A, 5B, 5C and 5D are views showing examples of moving data and character data displayed on the receiving apparatus 300 and a display apparatus 400 shown in FIG. 1.
Figure 5B:
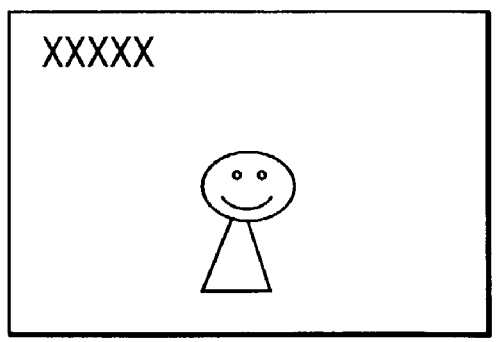

Step S406: The control unit 307 extracts (fetch) an ASCII code (this ASCII code representing a vendor name of the source node 100) from the vendor name textual descriptor 14, and sends the extracted ASCII code to the character data generation unit 303. Also the control unit 307 extracts an ASCII code (this ASCII code representing a model name of the source node 100) from the model name textual descriptor 15, and sends the extracted ASCII code to the character data generation unit 303. The character data generation unit 303 generates character data indicating the vendor name of the source node 100 utilizing the ASCII code extracted from the vendor name textual descriptor 14, and also generates character data indicating the model name of the source node 100 utilizing the ASCII code extracted from the model name textual descriptor 15. These two character data are generated instead of the default character data. The superimpose unit 304 superimposes the two character data, generated in the character data generation unit 303, on a predetermined position of the moving image data decoded in the decoder unit 302. The moving image data, in which the character data indicating the vendor name and the model name of the source node 100 is superimposed, are supplied to the monitor 305 and the image output unit 306, and displayed on the monitor 305 and the display apparatus 400. An example of the moving image data and the character data, displayed on the monitor 305 and the display apparatus 400 is shown in FIG. 5A. In FIG. 5B, "XXXXX" indicates character data indicating the vendor name of the source node 100, and, in FIG. 5A, "YYY DV20" indicates character data indicating the model name of the source node 100.

Step S407: The control unit 307 extracts an ASCII code (this ASCII code representing a vendor name of the source node 100) from the vendor name textual descriptor 14, and sends the extracted ASCII code to the character data generation unit 303. The character data generation unit 303 generates character data indicating the vendor name of the source node 100 utilizing the ASCII code extracted from the vendor name textual descriptor 14. The character data are generated instead of the default character data. The superimpose unit 304 superimposes the character data, generated in the character data generation unit 303, on a predetermined position of the moving image data decoded in the decoder unit 302. The moving image data, in which the character data indicating the vendor name of the source node 100 is superimposed, are supplied to the monitor 305 and the image output unit 306, and displayed on the monitor 305 and the display apparatus 400. An example of the moving image data and the character data, displayed on the monitor 305 and the display apparatus 400 is shown in FIG. 5B. In FIG. 5B, "XXXXX" indicates character data indicating the vendor name of the source node 100.

Step S408: The control unit 307 refers to the memory 308 and discriminates whether the model name textual descriptor 15 is present in the configuration ROM 101. If the model name textual descriptor 15 is present in the configuration ROM 101, the control unit 307 executes a process of a step S409. On the other hand, if the model name textual descriptor 15 is not present in the configuration ROM 101, the control unit 307 executes a process of a step S410.

Figure 5C:
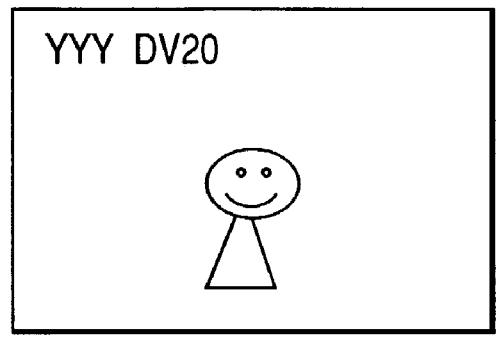

Step S409: The control unit 307 extracts an ASCII code (this ASCII code representing a model name of the source node 100) from the model name textual descriptor 15, and sends the extracted ASCII code to the character data generation unit 303. The character data generation unit 303 generates character data indicating the model name of the source node 100 utilizing the ASCII code extracted from the model name textual descriptor 15. The character data are generated instead of the default character data. The superimpose unit 304 superimposes the character data, generated in the character data generation unit 303, on a predetermined position of the moving image data decoded in the decoder unit 302. The moving image data, in which the character data indicating the model name of the source node 100 is superimposed, are supplied to the monitor 305 and the image output unit 306, and displayed on the monitor 305 and the display apparatus 400. An example of the moving image data and the character data, displayed on the monitor 305 and the display apparatus 400 is shown in FIG. 5C. In FIG. 5C, "YYY DV20" indicates character data indicating the model name of the source node 100.

Figure 5D:
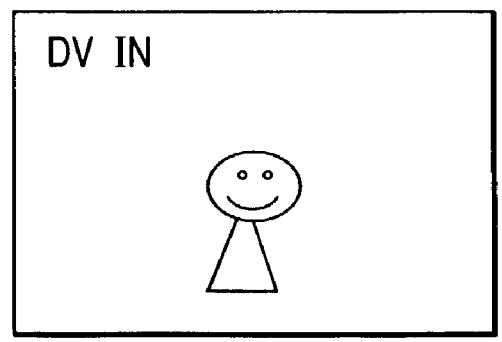

Step S410: The control unit 307 informs the character data generation unit 303 of generation of default character data. In response, the character data generation unit 303 generates default character data. The superimpose unit 304 superimposes the default character data, generated in the character data generation unit 303, on the moving image data decoded in the decoder unit 302. The moving image data, in which the default character data are superimposed, are supplied to the monitor 305 and the image output unit 306 and displayed on the monitor 305 and the display apparatus 400. An example of the moving image data and the character data displayed on the monitor 305 and the display apparatus 400 is shown in FIG. 5D, in which "DV IN" is the default character data.

Step S411: The control unit 307 discriminates whether the digital interface 301 has detected generation of a bus reset. If the digital interface 301 detects generation of a bus reset, the control unit 307 executes a process of a step S413.

Step S412: The control unit 307 discriminates whether the reception of the moving image data is to be terminated. If the reception of the moving image data is to be terminated, the control unit 307 executes a process of a step S413.

Step S413: The control unit 307 informs the character data generation unit 303 of an end of display of the character data. In response, the character data generation unit 303 terminates generation of the character data. As a result, the monitor 305 and the display apparatus 400 no longer display the default characters, the characters indicating the vendor name or the characters indicating the model name.

As explained in the foregoing, the receiving apparatus 300 of the present embodiment, in displaying the moving image data received from the network 200, can display the vendor name and/or the model name of the source node of the moving image data, thereby facilitating to identify the source node of the moving image data.

The above-described preferred embodiments are merely exemplary of the present invention, and are not to be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. A receiving apparatus comprising:
    a reception unit which receives moving image data transmitted from a source node;
    an acquisition unit which requests the source node to send information including a vendor name of the source node so as to acquire the vendor name of the source node from the source node;
    a character generation unit which generates vendor name character data indicating the vendor name of the source node acquired by said acquisition unit; and
    a synthesis unit which superimposes the vendor name character data on the moving image data if the vendor name of the source node is acquired by said acquisition unit, and superimposes predetermined character data on the moving image data if the vendor name of the source node cannot be acquired by said acquisition unit.

2. A receiving apparatus according to claim 1, further comprising:
    an output unit which outputs the moving image data, on which the vendor name character data are superimposed, to an external apparatus if the vendor name of the source node is acquired by said acquisition unit, and outputs the moving image data, on which the predetermined character data are superimposed, to the external apparatus if the vendor name of the source node cannot be acquired by said acquisition unit.

3. A receiving apparatus according to claim 1, further comprising:
    a display unit which displays the moving image data, on which the vendor name character data are superimposed if the vendor name of the source node is acquired by said acquisition unit, and displays the moving image data, on which the predetermined character data are superimposed if the vendor name of the source node cannot be acquired by said acquisition unit.

4. A receiving apparatus according to claim 1, wherein said acquisition unit acquires the vendor name of the source node from a configuration ROM of included in the source node.

5. A receiving apparatus according to claim 1, wherein said synthesis unit controls the process of superimposing the vendor name character data on the moving image data, according to the process of receiving the moving image data.

6. A receiving apparatus according to claim 1, wherein said synthesis unit stops superimposing the vendor name character data on the moving image data if said reception unit stops receiving the moving image data.

7. A receiving apparatus comprising:
a reception unit which receives moving image data transmitted from a source node;
an acquisition unit which requests the source node to send information including a model name of the source node so as to acquire the model name of the source node from the source node;
a character generation unit which generates model name character data indicating the model name of the source node acquired by said acquisition unit; and
a synthesis unit which superimposes the model name character data on the moving image data if the model name of the source node is acquired by said acquisition unit, and
superimposes predetermined character data on the moving image data if the model name of the source node cannot be acquired by said acquisition unit.

8. A receiving apparatus according to claim 7, further comprising:
an output unit which outputs the moving image data, on which the model name character data are superimposed, to an external apparatus if the model name of the source node is acquired by said acquisition unit, and outputs the moving image data, on which the predetermined character data are superimposed, to the external apparatus if the model name of the source node cannot be acquired by said acquisition unit.

9. A receiving apparatus according to claim 7, further comprising:
a display unit which displays the moving image data, on which the model name character data are superimposed if the model name of the source node is acquired by said acquisition unit, and displays the moving image data, on which the predetermined character data are superimposed if the model name of the source node cannot be acquired by said acquisition unit.

10. A receiving apparatus according to claim 7, wherein said acquisition unit acquires the model name of the source node from a configuration ROM included in the source node.

11. A receiving apparatus according to claim 7, wherein said synthesis unit controls the process of superimposing the model name character data on the moving image data, according to the process of receiving the moving image data.

12. A receiving apparatus according to claim 7,
wherein said synthesis unit stops superimposing the model name character data on the moving image data if said reception unit stops receiving the moving image data.

* * * * *

UNITED STATES PATENT AND TRADEMARK OFFICE
CERTIFICATE OF CORRECTION

PATENT NO. : 7,271,846 B2  Page 1 of 1
APPLICATION NO. : 10/391566
DATED : September 18, 2007
INVENTOR(S) : Takashi Kobayashi It is certified that error appears in the above-identified patent and that said Letters Patent is hereby corrected as shown below:

TITLE PAGE, ITEM [54] TITLE:

"RECEIVING APPARATUS" should read --RECEIVING APPARATUS HAVING INFORMATION REQUEST--.

COLUMN 1:

Line 1, "RECEIVING APPARATUS" should read --RECEIVING APPARATUS HAVING INFORMATION REQUEST--.
Line 29, "recording," should read --recorder,--.

COLUMN 2:

Line 58, "textural" should read --textual--.

COLUMN 3:

Line 9, "textural" should read --textual--.

COLUMN 7:

Line 7, "of" should be deleted.

Signed and Sealed this

Eighteenth Day of November, 2008

JON W. DUDAS
*Director of the United States Patent and Trademark Office*